(12) United States Patent
Bishop

(10) Patent No.: US 8,504,678 B2
(45) Date of Patent: Aug. 6, 2013

(54) TRAFFIC ROUTING BASED ON GEOPHYSICAL LOCATION

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 355 days.

(21) Appl. No.: 11/618,560

(22) Filed: Dec. 29, 2006

(65) Prior Publication Data

US 2007/0198702 A1    Aug. 23, 2007

Related U.S. Application Data

(60) Provisional application No. 60/755,398, filed on Dec. 30, 2005.

(51) Int. Cl.
*G06F 15/173* (2006.01)
*G06F 15/16* (2006.01)
*G06F 15/177* (2006.01)

(52) U.S. Cl.
USPC ............ 709/224; 709/232; 709/220; 709/221

(58) Field of Classification Search
USPC ........................................................ 709/224
See application file for complete search history.

(56) References Cited

U.S. PATENT DOCUMENTS

| | | | |
|---|---|---|---|
| 5,262,588 A | 11/1993 | Gallagher | |
| 5,548,806 A | 8/1996 | Yamaguchi et al. | |
| 5,721,819 A | 2/1998 | Galles et al. | |
| 5,940,765 A | 8/1999 | Haartsen | |
| 5,946,618 A | 8/1999 | Agre et al. | |
| 5,952,972 A | 9/1999 | Ittipiboon et al. | |
| 6,014,564 A | 1/2000 | Donis et al. | |
| 6,023,618 A | 2/2000 | Janhonen et al. | |
| 6,028,853 A | 2/2000 | Haartsen | |
| 6,055,429 A | 4/2000 | Lynch | |
| 6,075,990 A | 6/2000 | Shin | |
| 6,081,723 A | 6/2000 | Mademann | |
| 6,085,238 A | 7/2000 | Yuasa et al. | |
| 6,112,082 A | 8/2000 | Almgren et al. | |
| 6,125,276 A | 9/2000 | Lupien | |

(Continued)

FOREIGN PATENT DOCUMENTS

| | | |
|---|---|---|
| EP | 1172969 A2 | 1/2002 |
| JP | 9232850 A | 9/1997 |

(Continued)

OTHER PUBLICATIONS

"3rd Generation Partnership Project; Technical Specification Group Services and System Aspects; Functional Stage 2 Description of Location Services (LCS) Release 7", 3GPP TS 23.271 v7.3.0, Mar. 24, 2005.

(Continued)

*Primary Examiner* — Noel Beharry
(74) *Attorney, Agent, or Firm* — Russell S. Krajec; Krajec Patent Offices, LLC

(57) ABSTRACT

Applications requiring multiple network devices may use geophysical information about the nodes to route traffic. Each device attached to a network may have both a network address and a geophysical location. When an application requires the use of multiple devices, for example restricting content or services in a certain area or for prioritizing content or services in an area, the devices are identified and used based on their geophysical location rather than network addresses.

21 Claims, 6 Drawing Sheets

U.S. PATENT DOCUMENTS

| | | | |
|---|---|---|---|
| 6,324,402 B1 | 11/2001 | Waugh et al. | |
| 6,344,833 B1 | 2/2002 | Lin et al. | |
| 6,351,463 B1 | 2/2002 | DeSantis et al. | |
| 6,484,012 B1 | 11/2002 | Nche et al. | |
| 6,594,273 B1 | 7/2003 | McGibney | |
| 6,665,296 B1 | 12/2003 | Sturza et al. | |
| 6,771,673 B1 | 8/2004 | Baum et al. | |
| 6,897,373 B2 | 5/2005 | Barabash | |
| 6,898,433 B1 | 5/2005 | Rajaniemi et al. | |
| 6,903,702 B2 | 6/2005 | Kawai et al. | |
| 6,917,804 B2 | 7/2005 | Takayama et al. | |
| 6,948,000 B2 | 9/2005 | Desai et al. | |
| 6,961,555 B1 | 11/2005 | Philyaw | |
| 6,980,819 B2 | 12/2005 | Sugaya et al. | |
| 7,010,015 B2 | 3/2006 | Hervey, Jr. et al. | |
| 7,019,691 B1 | 3/2006 | Soltanian et al. | |
| 7,035,637 B2 | 4/2006 | Motegi et al. | |
| 7,039,392 B2 | 5/2006 | McCorkle et al. | |
| 7,047,009 B2 | 5/2006 | Laroia et al. | |
| 7,069,009 B2 | 6/2006 | Li et al. | |
| 7,072,346 B2 | 7/2006 | Hama | |
| 7,072,360 B2 | 7/2006 | Dravida et al. | |
| 7,096,000 B2 | 8/2006 | Yano | |
| 7,171,460 B2 | 1/2007 | Kalavade et al. | |
| 7,231,221 B2 | 6/2007 | Assarsson et al. | |
| 7,233,804 B2 | 6/2007 | Sugaya et al. | |
| 7,254,405 B2 | 8/2007 | Lin et al. | |
| 7,280,534 B2 | 10/2007 | Koppol | |
| 7,313,127 B2 | 12/2007 | Hoctor et al. | |
| 7,406,298 B2 | 7/2008 | Luglio et al. | |
| 7,412,246 B2 | 8/2008 | Lewis et al. | |
| 7,457,271 B2 | 11/2008 | Donovan | |
| 7,471,955 B2 | 12/2008 | Muramatsu | |
| 7,499,460 B2 | 3/2009 | Csapo | |
| 7,519,036 B2 | 4/2009 | Zhang | |
| 7,539,161 B2 | 5/2009 | Bolin et al. | |
| 7,545,826 B2 | 6/2009 | Sugaya | |
| 7,552,034 B2 | 6/2009 | Ebata et al. | |
| 7,555,260 B2 | 6/2009 | Melkesetian | |
| 7,586,879 B2 | 9/2009 | Chari et al. | |
| 7,593,718 B2 | 9/2009 | Gorday et al. | |
| 7,606,938 B2 | 10/2009 | Roese et al. | |
| 7,630,311 B2 | 12/2009 | Jung et al. | |
| 7,676,226 B2 | 3/2010 | Han et al. | |
| 7,689,225 B2 | 3/2010 | Funato et al. | |
| 7,706,369 B2 | 4/2010 | Roese et al. | |
| 7,729,337 B2 | 6/2010 | Saleh et al. | |
| 2002/0011953 A1 | 1/2002 | Reece et al. | |
| 2002/0061756 A1 | 5/2002 | Bleckert et al. | |
| 2002/0068584 A1* | 6/2002 | Gage et al. | 455/456 |
| 2002/0095498 A1* | 7/2002 | Chanda et al. | 709/225 |
| 2002/0105965 A1 | 8/2002 | Dravida et al. | |
| 2003/0008659 A1 | 1/2003 | Waters et al. | |
| 2003/0128987 A1* | 7/2003 | Mayer | 398/98 |
| 2003/0133450 A1 | 7/2003 | Baum | |
| 2003/0145106 A1* | 7/2003 | Brown | 709/238 |
| 2004/0184477 A1 | 9/2004 | Tavli et al. | |
| 2004/0185859 A1 | 9/2004 | Barkan | |
| 2005/0007993 A1* | 1/2005 | Chambers et al. | 370/349 |
| 2005/0068934 A1 | 3/2005 | Sakoda | |
| 2005/0124294 A1 | 6/2005 | Wentink | |
| 2005/0190757 A1 | 9/2005 | Sajassi | |
| 2005/0276251 A1* | 12/2005 | Biddiscombe et al. | 370/338 |
| 2005/0286486 A1 | 12/2005 | Miller | |
| 2006/0018276 A1 | 1/2006 | Kim et al. | |
| 2006/0046746 A1 | 3/2006 | Ranford et al. | |
| 2006/0089099 A1 | 4/2006 | Buchwald et al. | |
| 2006/0212588 A1* | 9/2006 | Haner et al. | 709/229 |
| 2007/0015516 A1 | 1/2007 | Huotari et al. | |
| 2007/0115883 A1 | 5/2007 | Narayanan et al. | |
| 2008/0133665 A1 | 6/2008 | Lybeck et al. | |
| 2008/0298275 A1 | 12/2008 | DeSousa | |

FOREIGN PATENT DOCUMENTS

| | | |
|---|---|---|
| JP | 2001000004307 | 7/2002 |
| KR | 1020010025591 | 4/2001 |
| WO | WO 98/12885 A2 | 3/1998 |
| WO | WO 2004/062198 A1 | 7/2004 |

OTHER PUBLICATIONS

"3rd Generation Partnership Project; Technical Specification Group Services and System Aspects; Vocabulary for 3GPP Specifications (Release 5)", 3GPP TR 21.905 v5.9.0, Mar. 24, 2005.

IEEE Computer Society, "802.11 FTM IEEE Trial-Use Recommended Practice for Multi-Vendor Access Point Interoperability via an Inter-Access Point Protocol Across Distribution Systems Supporting IEEE 802.11™ Operation", Jul. 14, 2003, Institute for Electrical and Electronics Engineers, Inc., NY, USA.

International Search Report and Written Opinion for PCT/US2006/017222 dated Aug. 25, 2006.

International Search Report and Written Opinion for PCT/US2006/017223 dated Aug. 25, 2006.

International Search Report and Written Opinion for PCT/US2006/027145 dated Dec. 18, 2006.

Press release from Nashville International Airport, "WiFi Arrives at Nashville International Airport," PRESSbooth.org, http://press.xtvworld.com/article-print-2836.html, Oct. 30, 2004.

"The Wi-Fi Business Model—Is There One?," posted by Andrew, Brighthand, Mar. 17, 2004.

"Spontaneous synchronization in multihop embedded sensor networks: demonstration of a server-free approach," Bletsas, A.; Lippman, A.; Wireless Sensor Networks, 2005. Proceeedings of the Second European Workshop on Jan. 31-Feb. 2, 2005. pp. 333-341. See: abstract, Sec. I and Sec. IIV.

Mary Kathleen Flynn, "Have Wi-Fi, Will Travel," U.S. News and World Report, May 2, 2004.

\* cited by examiner

500
METHOD FOR RESTRICTING
CONTENT BASED ON GEOPHYSICAL
LOCATION

TRAFFIC ROUTING BASED ON GEOPHYSICAL LOCATION

CROSS REFERENCE TO RELATED APPLICATIONS

This application claims priority to and benefit of U.S. Provisional Patent Application Ser. No. 60/755,398 filed 30 Dec. 2005 by Donald M. Bishop entitled "Traffic Routing Based on Geophysical Location", which is hereby incorporated by reference for all it discloses and teaches.

BACKGROUND OF THE INVENTION

Wireless networks are becoming ubiquitous and in some cases blanket a subdivision, town, or city with wireless voice and data coverage. In general, a network may consist of many wireless access points or nodes, each of which is connected to a network backbone that provides connectivity to the Internet, telephony services, video services, or other capabilities.

A dispersed network may be installed so that the network backbones follow the contours of geography, roads, and other features. As a network is deployed, especially when it is deployed in stages, the network may be installed such that many devices may be geographical neighbors, but may be separated by a circuitous network routing. Such may be the case for a cable television network, telephony network, or other wide area network.

When a network is maintained, devices such as wireless access points, amplifiers, routers, and other network devices may be removed and replaced with other units. The removed units may be repaired and returned to service in another geographical location. Over time, the physical location of a specific device on the network may change, and the physical locations of the devices as installed may be difficult to determine.

SUMMARY OF THE INVENTION

Applications requiring multiple network devices may use geophysical information about the nodes to route traffic. Each device attached to a network may have both a network address and a geophysical location. When an application requires the use of multiple devices, for example restricting content or services in a certain area or for prioritizing content or services in an area, the devices are identified and used based on their geophysical location rather than network addresses.

DETAILED DESCRIPTION OF THE INVENTION

Figure 1:
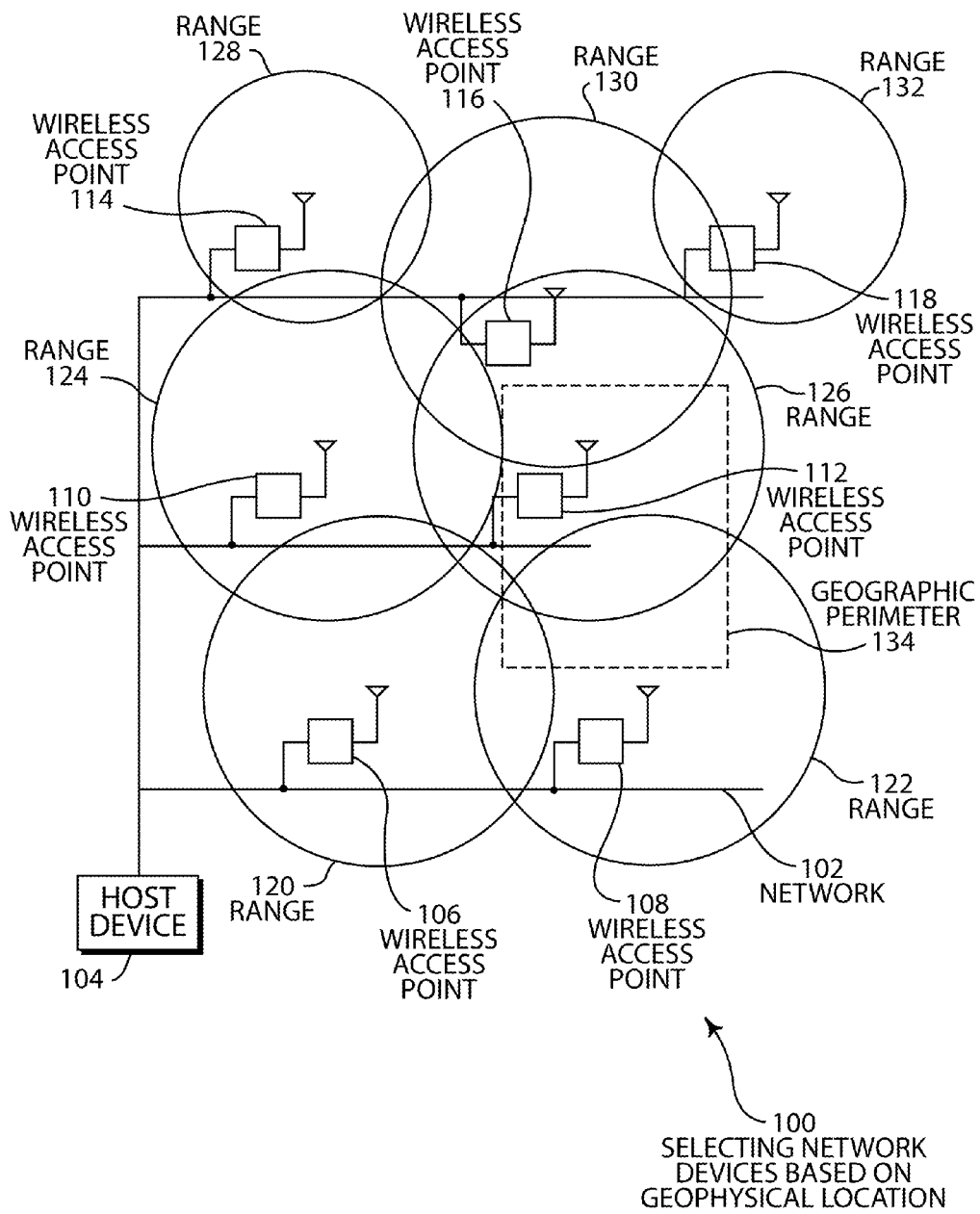
FIG. 1 is a diagrammatic illustration of an embodiment showing a wireless network with several devices selected based on a geographic perimeter.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the subject matter as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

FIG. 1 illustrates an embodiment 100 showing a network with dispersed devices where a subset of devices is selected based on their geophysical location. A network 102 has a host device 104 and wireless access points 106, 108, 110, 112, 114, 116, and 118 dispersed over a wide geographic region. Each wireless access point 106, 108, 110, 112, 114, 116, and 118 has an effective range 120, 122, 124, 126, 128, 130, and 132, respectively. A geographic perimeter 134 has been identified for special routing of signals.

The embodiment 100 is an example of a network that has devices dispersed over a large geographic area. The embodiment may be, for example, a wireless access system for providing data, voice, and video to a town or neighborhood. In another embodiment, the network may be for cellular phone service using conventional cellular phone technologies.

With dispersed devices attached to a network, there may be a need for routing and handling of content on the network based on an event that has a geophysical boundary. When the boundary is established, network devices near the location are identified and caused to change the handling of network traffic.

In a conventional network, the network administrators operate and maintain the remote devices through network addresses. These addresses are used to communicate with each device along the network communication path, but the network addresses do not necessarily correspond with physical locations. For example, the network administrator may communicate with the wireless access points 110 and 112 through the network and assume that the devices are located near each other because they are next to each other on a branch of the network. However, from the network administrator may not realize that wireless access point 116 is even closer to wireless access point 112 than wireless access point 110 because wireless access point 116 is on a different branch of the network.

In order to handle situations where the geophysical location of an event drives some network action, the geophysical location of each affected device on the network may be known. In some embodiments, the physical location of each device is known in the host device 104, whereas in other embodiments, the physical location information of each device is in the device itself and can be queried by the host device 104.

Events that can relate to geophysical location can fall into two large categories: those events where specific content is given a high priority and those events where specific content is given a low priority. An example of the former may be where an emergency vehicle is using the network for communications at a specific location. For example, a structure fire in a neighborhood covered by wireless transmitters may be an event where voice or data communications between the network and emergency responders are given high priority at the expense of other traffic on the network. The perimeter 134 for the event may be larger than one wireless access point and may span several wireless access points 106, 108, 112, 116, and 130.

An example of an event where specific content is given a low priority may be to restrict specific web content, such as pornography, from being transmitted in the vicinity of a school during normal school hours. In such an example, the perimeter of the school may define a geographic perimeter 134 served by one or more wireless access points 106, 108, 112, 116, and 130.

In many embodiments, the traffic routing event may be a temporary measure, such as the example with emergency responders to a structure fire, a recurring measure, such as the example of limiting pornography transmissions to a school while in session, or a permanent event such as configuring network devices in a geographic location.

In some embodiments, the traffic routing event may cause data to be handled differently by the devices on the network. For example, if a portion of the bandwidth is to be allocated in an emergency situation, other non-priority traffic may be processed and transmitted at a lower resolution and lower quality so that bandwidth remains open for any high priority traffic. In another example, the non-priority traffic may be buffered or cached differently so that the traffic may move across the network during periods of unused bandwidth.

Various configuration parameters of the network traffic routing may be changed based on the geophysical location of the devices on the network.

In some embodiments, the physical connections between devices may be modified. In an example of a high priority emergency situation in a certain area, the devices within the area may be configured to operate at a higher bandwidth, at a higher power level in the case of a radio transmitter, or with an alternative handshaking or flow control protocol.

In other embodiments, the data link layer may be modified. For example, to communicate with a specific emergency responder using a wireless device with a specific address, traffic destined for the emergency responder's mobile device may be transmitted on two or more wireless access points simultaneously. In such an example, the data link layer of two or more network devices may be modified to accept transmissions for the emergency responder's mobile device even though the mobile device is not in communication with each network device separately. In another example, the addresses of the network devices may be given aliases to facilitate communication with a mobile device, to redundantly route traffic to a designated area, or for any other purpose.

In still other embodiments, the routing of traffic across certain devices may change the network layer settings. For example, some data may be given a higher quality of service while other data may be temporarily or permanently given a lower quality of service.

In yet more embodiments, the transport layer for the affected network devices may be changed to accommodate higher bandwidths, lower bandwidths, or any other change. For example, packet size may be adjusted, handshaking may be altered, or various flow control settings may be changed.

The session layer may also be modified by changing session parameters for applications running on the network device. The session parameters may be changed from full duplex to half duplex, for example, to free up bandwidth, or certain sessions may be operated at a higher or lower priority.

The presentation layer may be affected by geographical boundaries. For example, encryption settings may be strengthened or relaxed in a geographic area for a temporary period or as a standard setting for that area. For example, in a network that covers a company's campus, the company may require a high level of encryption for all communications across the network in the area of the company's buildings. Other areas served by the network may have a default encryption setting that is less stringent.

The application layer may also be modified in some embodiments. For example, an application running on the various network devices may be launched, halted, paused, or have various parameters modified during the course of operation. In a simple example, the various wireless access points of embodiment 100 may be running applications that individually monitor performance of the wireless access point. These applications may be paused or caused to be in a reduced mode when emergency bandwidth is required.

The network 102 may be any type of communications network, such as a twisted pair digital subscriber line (DSL) network used in telephony, a hybrid fiber coax (HFC) network used in cable television networks, any type of wired or wireless network backbone.

If the network 102 is a DSL or HFC network, the host device 104 may be a digital subscriber line access manager (DSLAM) or a cable headend, respectively. In other embodiments, the host device 104 may be any device in communication with the network 102. The host device 104 may determine the geophysical location of the various network devices, determine when a traffic routing event occurs, and coordinate the changes necessary to the devices on the network to respond to the traffic routing event. In other embodiments, some or all of the host device functions may be performed by one or more of the network devices.

The host device 104 may determine the geophysical location of the various network devices by any manner possible. In some embodiments, a maintenance technician may manually enter the physical location of a network device into a database maintained by the host device 104. In other embodiments, the individual network devices may have geophysical location information stored in a memory location in the device or may have a built-in global positioning system or other mechanism for determining geophysical location. In still other embodiments where wireless devices are connected with a network backbone, the geophysical location of various network devices may be determined by triangulation.

The host device 104 may determine that a traffic routing event has occurred by any appropriate method. For example, the host device 104 may receive a command from a user through an attached network device that a traffic routing event has occurred. In another example, a network device may be capable of determining that an event has occurred and may transmit the traffic routing information to the host device 104. In yet another example, the host device 104 may monitor traffic on the network and may identify a traffic routing event through passive monitoring of the network devices and traffic across the network.

The devices on the network 102 may be contacted by the host device 104 in response to the traffic routing event. For example, in an embodiment where the geophysical location of the devices are stored in a database on the host device 104, the host device 104 may determine which devices are affected and send a message to each affected device.

In another example where the geophysical location of the devices is stored in the devices themselves, the host device 104 may send a broadcast message to all devices with instructions for devices within a certain geophysical location. The individual devices may determine whether they are within the geophysical boundaries and execute the instructions based on the broadcast message.

The network devices may be any type of network device that can respond to a traffic routing event. For example, the network device may be a wireless access point 112 that is capable of routing network traffic to a wireless device within the range 126. Such a device may be capable of changing settings for every OSI layer from the data layer 1 to the application layer 7, depending on the particular embodiment. In some embodiments, the network devices may be routers, computers, switches, servers, connection points, amplifiers, transceivers, splitters, or any other network device that handles network traffic.

In some embodiments, the network devices may be the sources of traffic across the network. For example, a computer located on the network may provide weather monitoring information using a web based interface. During a traffic routing event, the weather monitoring application may be instructed to provide low bandwidth text-only web pages but during normal operations, the application may provide rich, graphical web pages with animation.

Figure 2:
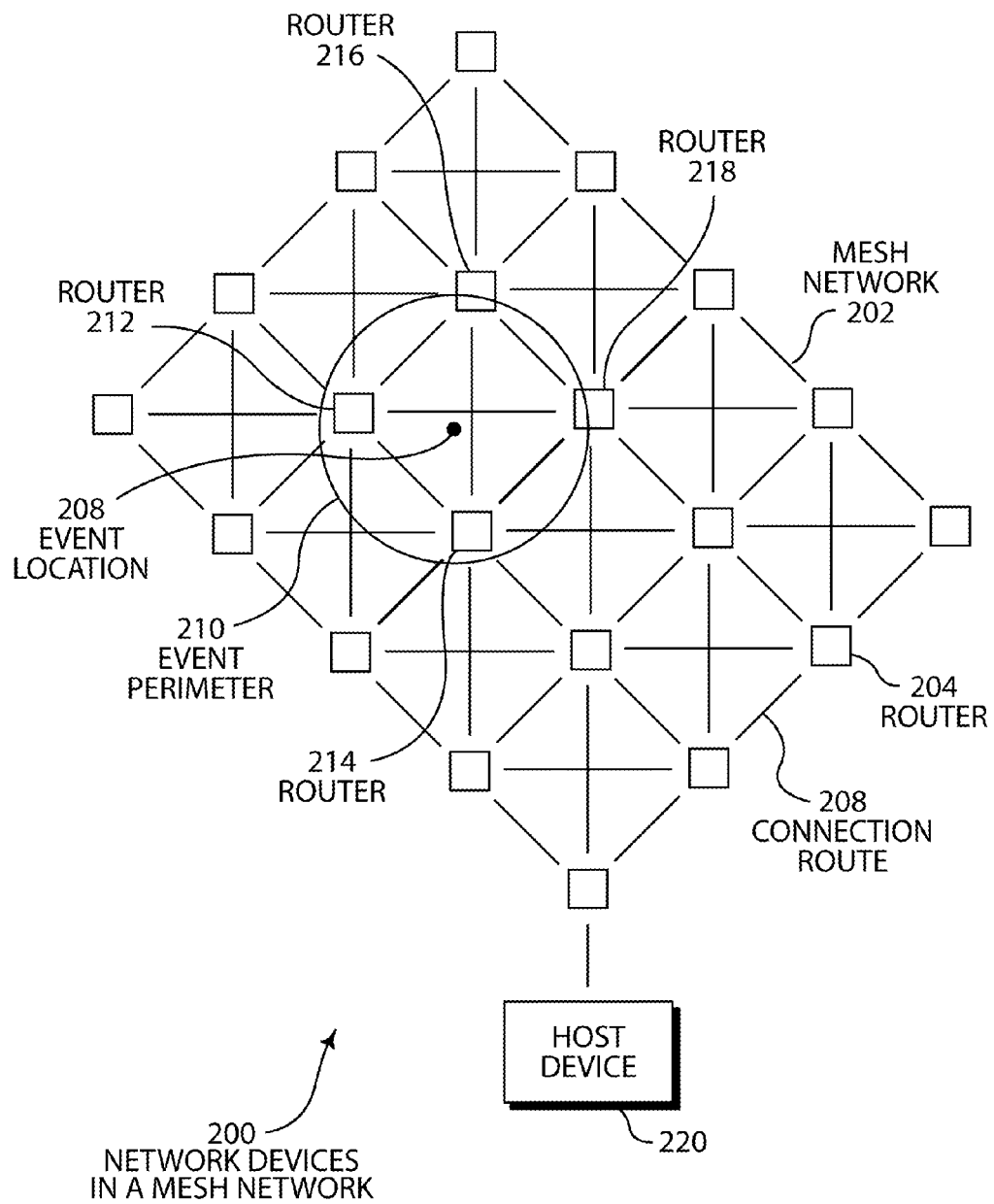
FIG. 2 is a diagrammatic illustration of an embodiment showing a mesh network with several devices selected based on a geographic perimeter.

FIG. 2 is a diagrammatic illustration of an embodiment 200 showing a mesh network. The mesh network 202 comprises a plurality of routers 204 that are connected via several connection routes 206. An event location 208 has an event perimeter 210 that encircles routers 212, 214, 216, and 218. A host device 220 is connected to the network 202.

The mesh network 202 may be any type of network where there are multiple paths between routing devices. In some embodiments, the mesh network 202 may be a wired network, such as the Internet or a large scale network having redundant connections. In other embodiments, the mesh network 202 may be a wireless network where each router 204 may repeat signals to neighboring routers.

The routers 204 may be any device that handles data transferred over the network 202. The routers 204 may be large scale network routers capable of routing huge amounts of data or may be devices that perform routing operations as a secondary or ancillary function. For example, dedicated routers used on large scale networks may perform routing as a primary function, while some mobile wireless devices in a peer to peer mesh network may perform packet transfer, routing, and other handling to neighboring mobile devices as a secondary function.

In some cases, the routers 204 may handle data at very low levels, such as data link layer or physical layer, while in other cases, the routers 204 may operate at the application layer, presentation layer, or any other layer.

The traffic routing event 208 may be defined by a point and a perimeter 210, in contrast to the rectangular perimeter 134 illustrated in FIG. 1. Each embodiment may have a specific mechanism for defining a traffic routing event. In some cases, a point and radius definition may be suited for an event such as a fire or police emergency at a specific location. In other cases, a more complex boundary may be appropriate, such as around a business or educational campus.

Figure 3:
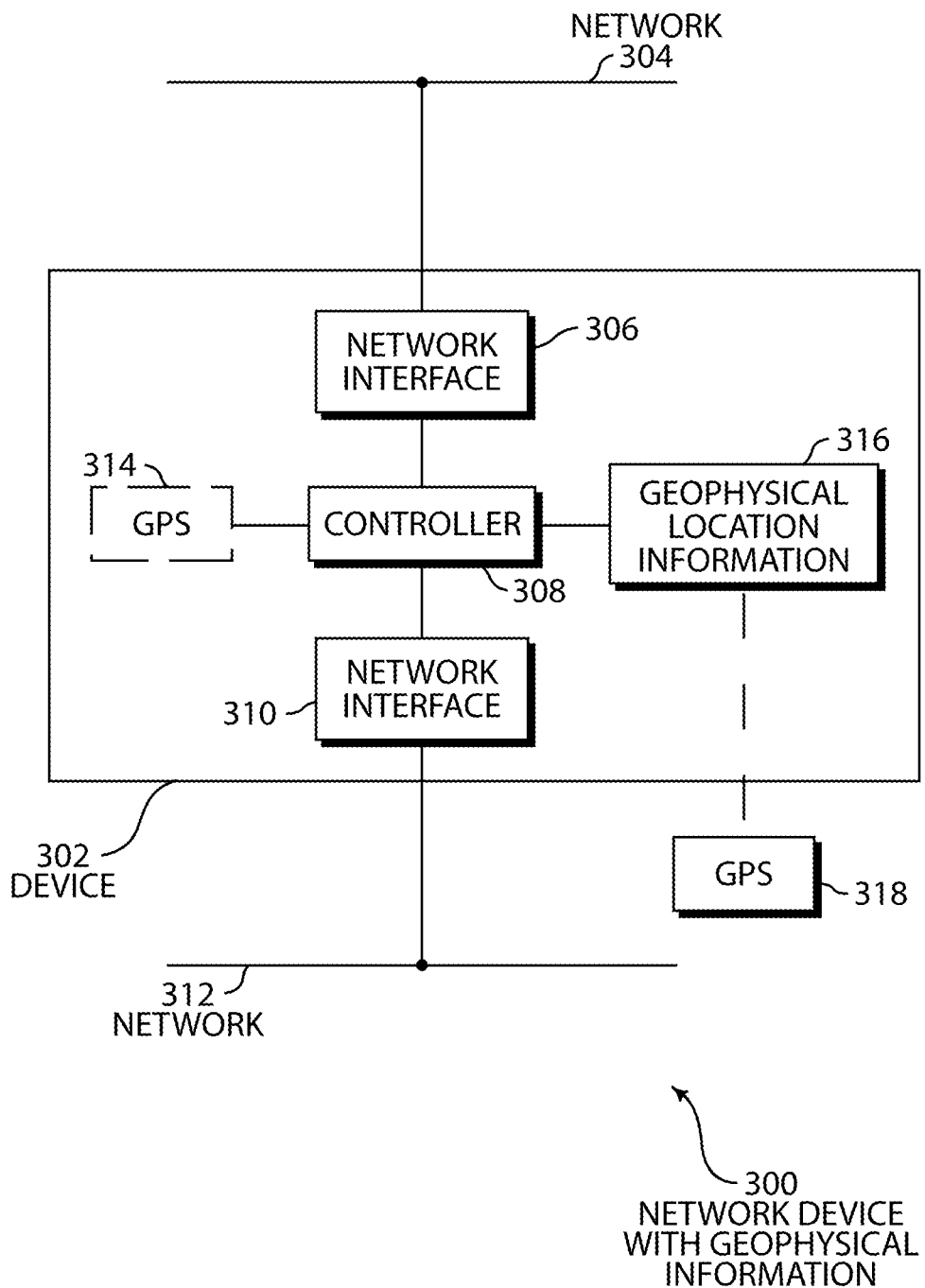
FIG. 3 is a diagrammatic illustration of an embodiment showing a device with integral or external geophysical location devices.

FIG. 3 illustrates an embodiment 300 of a network device with geophysical information. The device 302 connects to a network 304 through a network interface 306. A controller 308 is connected to the network interface 306 and a second network interface 310, which in turn is connected to a network 312. The controller may have an integral global positioning system device 314, or may have geophysical location information 316 that is set by a remote or removable global position system device 318.

The device 302 can be any network device that handles routing of data across a network. In some cases, the network 304 and network 312 may be the same type of network, as in the case of an Ethernet router or switch which may have a plurality of network interfaces 310, each being directed to a different computer or device on the overall network. In other cases, the network 304 and network 312 may be different, as in the case of a wireless access point, which may have a wireless antenna connection to the network interface 310 and a wired connection to a network backbone on network interface 306. In some cases, the network 304 and network 312 may be a peer to peer connection between various devices, while in other cases the network connections may perform a client-server connection.

The device 302 may determine geophysical location information through several different mechanisms. For example, a global positioning system (GPS) device 314 may be built into the device 302. By having a GPS in the device 302, the device 302 may be able to determine its geophysical position. This concept is useful for devices that are mobile, such as handheld wireless devices, but also for hardwired and permanently located devices.

In dispersed networks, such as telephony networks, cable television networks, or other wide area networks, devices may be located over many hundreds or thousands of square miles. Over time, maintenance technicians may service or replace components on the network, removing one device 302 and replacing it with another. Some devices may be swapped out, repaired, and enter service in another physical location. By placing a GPS receiver in each device 302, the physical location of a network device can always be determined without relying on any action from a maintenance technician to accurately record the location in a database. An additional benefit to incorporating geophysical location in a device 302 is that maintenance technicians may be easily directed to a faulty device.

The geophysical location information 316 may be determined by a detachably mounted global positioning system 318. In such an embodiment, a maintenance technician may use a handheld GPS 318 to plug into the device 302 and set the geophysical location information 316 to the device. The geophysical location information 316 may be stored in a volatile memory location such that if the device 302 were powered down and taken off line, the physical location information would be reset. Such an embodiment may erase the geophysical location information 316 if the device 302 was physically relocated.

Other mechanisms exist for determining the geophysical location information 316. In some networks, it may be possible to determine the relative or absolute position of a device through triangulation with other known signals. For example, a radio transceiver may be able to determine a crude position through triangulation with other radio transceivers, known radio broadcasts, or other signals.

Figure 4:
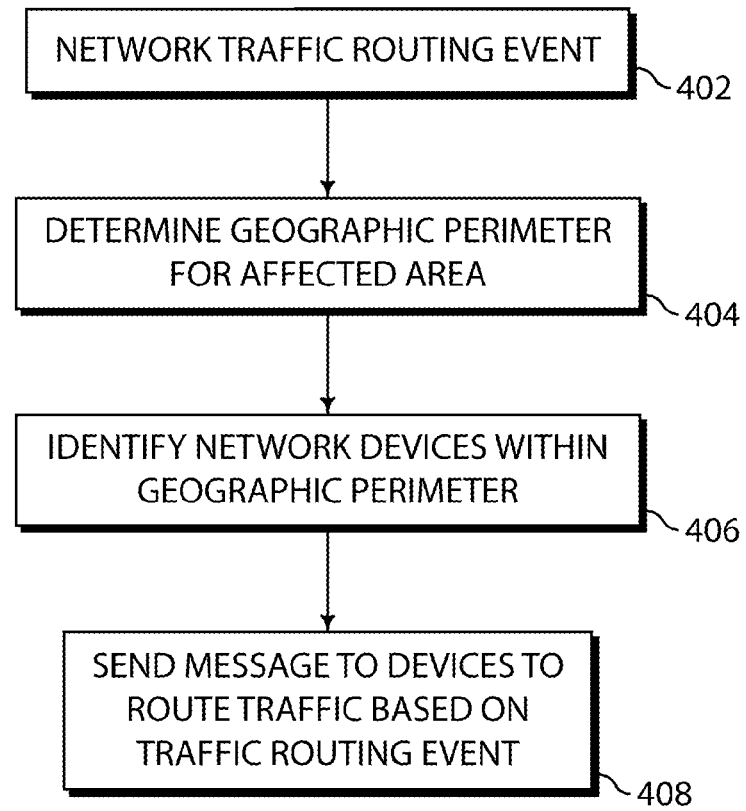
FIG. 4 is a flowchart illustration of an embodiment showing a method for controlling devices based on geophysical location.

FIG. 4 is a flowchart illustration of an embodiment 400 showing a method for controlling devices based on geophysical location. A network traffic routing event occurs in block 402. A geographic perimeter for the network traffic routing event is determined in block 404, and devices are identified within the geographic perimeter in block 406. A message is sent to the devices within the perimeter to route traffic based on the traffic routing event in block 408.

The embodiment 400 illustrates a high level sequence for changing traffic routing based on a geographic boundary. In some embodiments, the method may be performed by a host device attached to the network that can centrally receive event notices, determine the affected devices, and make changes to the devices. In other embodiments, the method may be performed by peers in the network, where one of the affected network devices may determine that an event has occurred and relate the changes to the other affected network devices.

The network traffic routing event in block 402 may be any event where network traffic may be changed or handled differently. In some cases, specific traffic may be restricted, while in other cases specific traffic may be prioritized. The changes to the network devices may be on a very low level, such as changing baud rates, or may be at a very high level such as changing variables or starting and stopping applications running on the network devices.

The geographic perimeter of the traffic routing event may be defined in any manner useful to the situation. In some cases, a complex serpentine geographical definition may be appropriate while in other cases a center point and radius may define the perimeter.

The devices that are affected by the traffic routing event are identified in block 406. In some embodiments, a central database of location information may be kept at a host device. The host device may search the database for devices within the geographic boundary, devices that may broadcast into the boundary, or any other device that may be affected. In other embodiments, a broadcast message with the geographic boundary information may be sent to all devices. Each device may determine if it is within the boundary or is otherwise affected by the traffic routing event and perform the appropriate steps.

Figure 5:
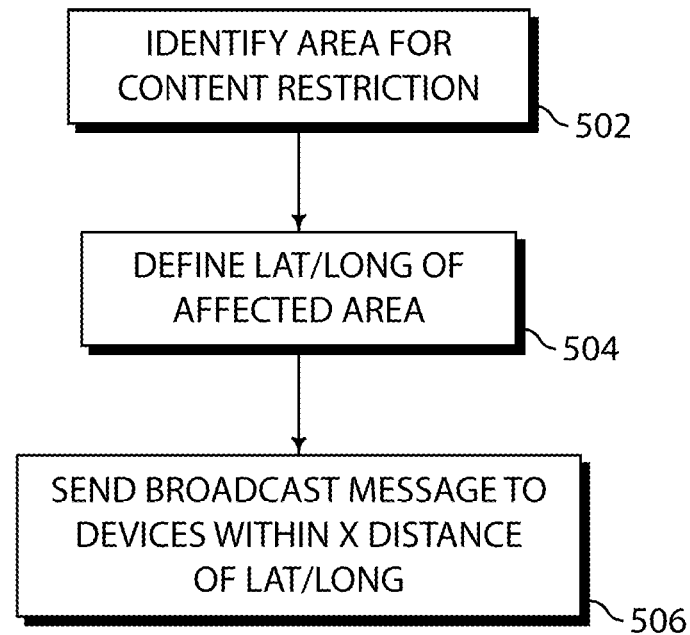
FIG. 5 is a flowchart illustration of an embodiment showing a method for restricting content based on geophysical location.

FIG. 5 is a flowchart illustration of an embodiment 500 showing a method for restricting content based on geographical location. An area for content restriction is identified in block 502, the latitude and longitude of the affected area is defined in block 504, and a broadcast message is sent to devices within a specific distance from the latitude and longitude in block 506

The embodiment 500 illustrates a method for restricting content and a method where the geographic perimeter is defined using single point and radius, as defined by a latitude, longitude, and distance.

Restricted content may be any type of data that can be filtered. In some cases, data may be analyzed to determine if the data contain pornography, specific phrases or language, or some kind of unwanted content. The data may be analyzed to determine the source of the data and be restricted on that basis. On a lower level, all data of a specific format, such as voice, video, HTTP, or XML may be restricted. Sessions established with a specific port or host may be restricted, while data having specific addresses or routing information may be restricted. On a very low level, data being transmitted at specific baud rates or using a specific handshaking routine may be restricted.

The changes made to the affected devices may be to change how the restricted content is handled. For example, video content may be restricted to a specific packet size or specific sessions on a port may be set to have a low baud rate. In other embodiments, pornography or content from a known spammer may be deleted in their entirety.

Figure 6:
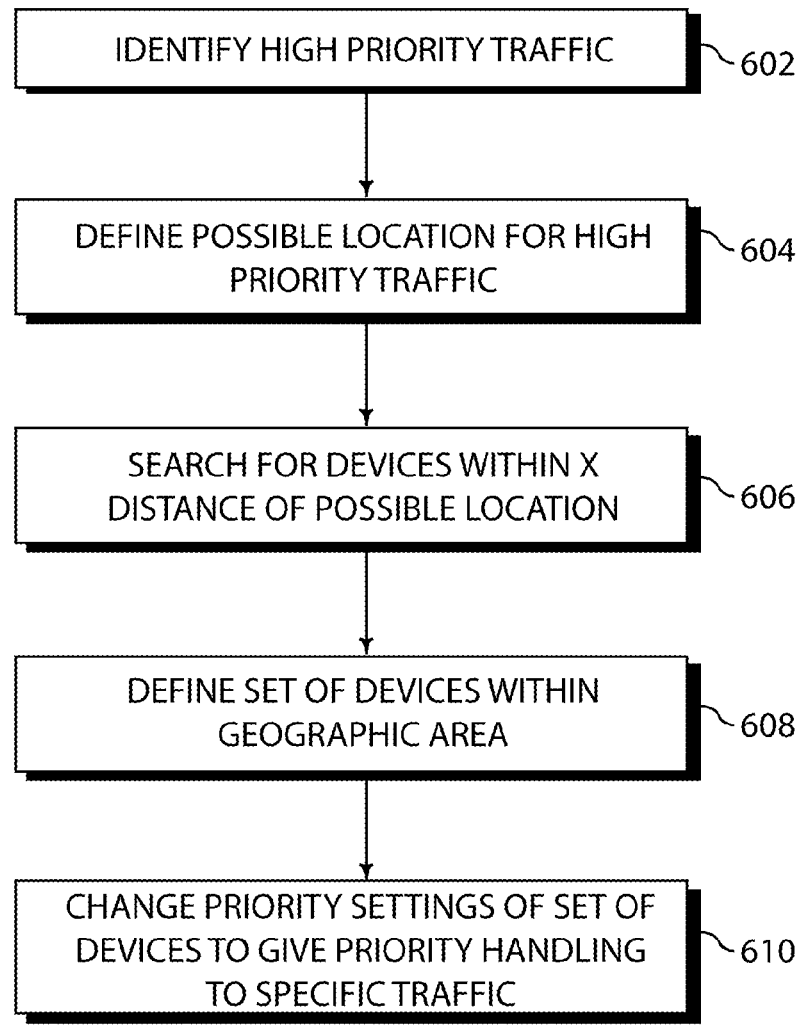
FIG. 6 is a flowchart illustration of an embodiment showing a method for prioritizing content based on geophysical location.

FIG. 6 illustrates an embodiment 600 of a method for prioritizing traffic based on geophysical location. High priority traffic is identified in block 602. Possible locations for the high priority traffic are identified in block 604 and devices within the location are searched in block 606 to define a set of affected devices in block 608. The priority settings for the set of devices are changed in block 610.

The embodiment 600 illustrates a method whereby specific traffic may be prioritized based on the geophysical location of devices that may handle the traffic. The embodiment 600 further illustrates a method that might be used by a host device or central controller to monitor and control network devices.

The high priority traffic may be identified by any method, from application and high level data types to network addresses, routing numbers, and physical layer settings. Similarly, the handling of the high priority traffic may comprise changing the way the high priority traffic is handled from the application layer to the physical layer. Each embodiment may have different requirements to identify the specific data and change how the data are handled by the network devices.

The foregoing description of the subject matter has been presented for purposes of illustration and description. It is not intended to be exhaustive or to limit the invention to the precise form disclosed, and other modifications and variations may be possible in light of the above teachings. The embodiment was chosen and described in order to best explain the underlying principles and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   determining that a network traffic routing event has occurred on a network having a network backbone and a plurality of network devices dispersed over a geographic area, said network traffic routing event comprising increasing priority to a specific content type, said network devices being capable of routing traffic within said network;
   determining a geographic perimeter for said network traffic routing event, said geographic perimeter being defined by a point and a perimeter;
   identifying a subset of network devices within said geographic perimeter, said subset of network devices corresponding to said portion of said network; and
   sending a communication to said subset of network devices to route traffic based on said network traffic routing event.

2. The method of claim 1 wherein said network traffic routing event comprises allocating a minimum bandwidth to said specific content type.

3. The method of claim 1 wherein said network traffic routing event comprises restricting a second set of specific content types.

4. The method of claim 1 wherein said network devices comprise geophysical location information.

5. The method of claim 4 wherein said geophysical location information is derived from triangulation.

6. The method of claim 4 wherein said geophysical location information is derived from a global positioning system.

7. The method of claim 1, said specific content type being a general content type not associated with a specific device.

8. The method of claim 7, said specific content type comprising at least one of a group composed of:
   voice;
   video;
   sessions on a predefined port; and
   data containing specific phrases.

9. A host device comprising:
   a connection to a network backbone;
   a controller in communication with a plurality of network devices through said connection, each of said plurality of network devices having geophysical location information and a network address, said network devices being capable of routing traffic within said network;
   said controller adapted to:
      determine that a network traffic routing event has occurred, said network traffic routing event comprising a change to priority for a specific content type within a portion of a network;
      determine a geographic perimeter for said network traffic routing event, said geographic perimeter being defined by a point and a perimeter;
      identify a subset of network devices within said geographic perimeter;
      change traffic routing on said subset of network devices based on said network traffic routing event.

10. The host device of claim 9 wherein said network traffic routing event comprises allocating a minimum bandwidth to specific content.

11. The host device of claim 9 wherein said network traffic routing event comprises restricting specific content.

12. The host device of claim 11 wherein said specific content comprises content from a list of specific content sources.

13. The host device of claim 11 wherein said specific content comprises filtered content.

14. The host device of claim 9 wherein said network devices comprise geophysical location information.

15. The host device of claim 14 wherein said geophysical location information is derived from triangulation.

16. The host device of claim 14 wherein said geophysical location information is derived from a global positioning system.

17. The host device of claim 16 wherein said global positioning system is detachable from at least one of said network devices.

18. The host device of claim 17 wherein said at least one of said network devices comprises a volatile memory storage comprising said geophysical location information.

19. The host device of claim 9 wherein at least one of said network devices comprises a wireless transceiver.

20. The host device of claim 9, said specific content type being a general content type not associated with a specific device.

21. The host device of claim 20, said specific content type comprising at least one of a group composed of:
   voice;
   video;
   sessions on a predefined port; and
   data containing specific phrases.

* * * * *